(12) United States Patent
Gekeler

(10) Patent No.: US 8,462,524 B2  
(45) Date of Patent: Jun. 11, 2013

(54) 3-LEVEL PULSE WIDTH MODULATION INVERTER WITH SNUBBER CIRCUIT

(75) Inventor: Manfred W. Gekeler, Constance (DE)

(73) Assignee: Hochschule Konstanz, Constance (DE)

( * ) Notice: Subject to any disclaimer, the term of this patent is extended or adjusted under 35 U.S.C. 154(b) by 0 days.

(21) Appl. No.: 13/579,364

(22) PCT Filed: Dec. 21, 2010

(86) PCT No.: PCT/EP2010/007849
§ 371 (c)(1),
(2), (4) Date: Aug. 16, 2012

(87) PCT Pub. No.: WO2011/101015
PCT Pub. Date: Aug. 25, 2011

(65) Prior Publication Data
US 2012/0307533 A1    Dec. 6, 2012

(30) Foreign Application Priority Data
Feb. 18, 2010   (DE) .......................... 10 2010 008 426

(51) Int. Cl.
*H02H 7/122*     (2006.01)
*H02M 7/515*     (2007.01)
*H02M 7/521*     (2006.01)
*H02M 1/06*      (2006.01)

(52) U.S. Cl.
USPC .......................... 363/56.12; 363/135; 363/138

(58) Field of Classification Search
USPC .................. 363/41, 56.12, 57, 131, 132, 135, 363/136, 138
See application file for complete search history.

(56) References Cited

U.S. PATENT DOCUMENTS 4,682,266 A * 7/1987 Huynh et al. ................. 361/235
5,748,464 A * 5/1998 Schuetz ....................... 363/131

(Continued)

FOREIGN PATENT DOCUMENTS

| DE | 42 19 644 A1 | 12/1993 |
| DE | 199 45 864 A1 | 10/2000 |
| EP | 0 727 870 A2 | 8/1996 |

OTHER PUBLICATIONS

International Preliminary Report on Patentability mailed Aug. 21, 2012 in corresponding application No. PCT/EP2010/007849.

(Continued)

*Primary Examiner* — Adolf Berhane
*Assistant Examiner* — Gary Nash
(74) *Attorney, Agent, or Firm* — Renner Kenner Greive Bobak Taylor & Weber

(57) ABSTRACT

The present invention relates to a circuit arrangement which comprises at least one 3-level pulse width modulation inverter with a snubber circuit. The snubber circuit is formed by at least one coil (L), two capacitors (Cu, Co) and a series connection comprising four diodes (Dh1-Dh4) poled in the same direction, whereof the two outer diodes (Dh1, Dh4) are in each case directly connected to the input terminals (1, 3) for the positive and the negative pole of the input voltage. The electrical connection between the two inner diodes (Dh2, Dh3) is connected on the one hand via the coil (L) to the input terminal (2) for the center tap of the input voltage and on the other hand to the middle bridge branch of the pulse width modulation inverter. In one embodiment, the two capacitors (Cu, Co) are in each case connected with one terminal to the electrical connection between one of the inner diodes (Dh2, Dh3) and one of the outer diodes (Dh1, Dh4) and with the other terminal directly to the output terminal (4).

With the proposed circuit, switching losses are completely avoided as a matter of principle with a simple and low-cost design.

7 Claims, 11 Drawing Sheets

U.S. PATENT DOCUMENTS

| | | | | |
|---|---|---|---|---|
| 5,953,222 | A * | 9/1999 | Mizutani | 363/56.05 |
| 5,982,646 | A | 11/1999 | Lyons et al. | 363/58 |
| 6,069,809 | A * | 5/2000 | Inoshita | 363/98 |
| 6,205,040 | B1 * | 3/2001 | Teichmann | 363/57 |
| 6,278,626 | B1 * | 8/2001 | Teichmann | 363/135 |
| 6,392,907 | B1 * | 5/2002 | Ichikawa | 363/98 |
| 6,930,899 | B2 * | 8/2005 | Bakran et al. | 363/132 |
| 2004/0246756 | A1 * | 12/2004 | Bijlenga et al. | 363/132 |
| 2009/0244936 | A1 * | 10/2009 | Falk et al. | 363/40 |

OTHER PUBLICATIONS

International Search Report mailed Jan. 20, 2012 in corresponding application No. PCT/EP2010/007849.

Munk-Nielson et al.; *A three level Natural Clamped Inverter (NCI)*; Aalbord University, Denmark, Institute of Energy Technology; IECON 02; Industrial Electronics Society, IEEE 2002; 28$^{th}$ Annual Conference; vol. 4, 2002, pp. 3123-3128.

Munk-Nielson et al.; *Comparison of soft and hard switching efficiency in a three-level single phase 60 kW dc-ac converter*; Aalborg University, Denmark; EPE 2003; Toulouse, France, Sep. 2-4, 2003.

Takano et al.; *Auxiliary resonant commutated soft-switching inverter with bidirectional active switches and voltage clamping diodes; Conference Record of the 2001 IEEE Industry applications Conference;* 36$^{th}$ IAS Annual Meeting, Chicago, IL; Sep. 30-Oct. 4, 2001; New York, NY: IEEE, US, Bd. 3, 30; Sep. 30, 2001.

Teichmann et al.; *Investigation and comparison of auxiliary resonant commutated pole converter topologies*; Power Electronics Specialists Conference; 1998; Pesc 98 Record; 29h Annual IEEE; Fukuoka, Japan; May 17-22, 1998; New York, NY; USA, IEEE, US BD. 1; May 17, 1998.

* cited by examiner

3-LEVEL PULSE WIDTH MODULATION INVERTER WITH SNUBBER CIRCUIT

TECHNICAL FIELD OF APPLICATION

The present invention relates to a circuit arrangement which comprises at least one 3-level pulse width modulation inverter with a snubber circuit and comprises input terminals for a positive pole, a negative pole and a centre tap of an input voltage as well as an output terminal, wherein the pulse width modulation inverter comprises at least two outer switching elements, which are connected to the input terminals for the positive and the negative pole of the input voltage, and two inner switching elements, which are connected to the output terminal. In such a circuit arrangement, the snubber circuit serves to reduce the switching losses of the pulse width modulation inverter.

Pulse width modulation inverters generate from a direct voltage source one or more pulsed voltages, which apart from the pulse frequency (several kHz up to over 20 kHz) have a fundamental oscillation with an adjustable frequency (0 to approx. 500 Hz) and an adjustable effective voltage value. They are required in numerous technical areas of application, such as for example drive engineering or photovoltaics. Thus, in drive engineering, the three-phase pulse width modulation inverters usually used serve to supply induction machines (synchronous motors and asynchronous motors) and guarantee a low-loss adjustment of the speed. In the area of photovoltaics, power inverters are required for the input to the network.

Solar generators generate electrical energy in the form of direct current and direct voltage. In order to make the latter usable in the alternating current supply networks, the direct voltage or the direct current has to be converted into a network-synchronised alternating voltage or into a network-synchronised alternating current with a network frequency (50 Hz or 60 Hz). For single-phase networks, use is made of single-phase pulse width modulation inverters, three-phase designs being used for three-phase alternating current networks. A comparable input for the network is also required with electric drives in a generator operation, for example in wind turbines. A further area of application of pulse width modulation inverters is the so-called Power Factor Correction (PFC): If, during the removal or the supply of electrical energy from or to the alternating current network, a high power factor and therefore a largely sinusoidal current is required, this can take place with single- or three-phase pulse width modulation inverters.

The pulsed output voltage of a pulse width modulation inverter is generated with the aid of power semiconductors which can be switched on and off. The latter are operated as electronic switches and are referred to as switching elements in the present patent application. Power semiconductors are semiconductor elements which are designed for the control and switching of high electric currents and voltages (more than 1 A and more than approx. 24 V). Examples of power semiconductors that can be used in pulse width modulation inverters are transistors, such as for example MOSFET, JFET or IGBT, or thyristors which can be switched on and off by control pulses, such as GTO or IGCT.

In the case of so-called "hard" switching, high values of voltage and current and therefore very high values of the instantaneous value of the power loss occur simultaneously during the switching-on operation and the switching-off operation. Multiplied by the number of switching-on and switching-off operations per second, the so-called switching frequency, the mean value of the switching power loss then results. With low values of the switching frequency (up to approx. 1 kHz), the switching power loss is often negligible. In the case of higher values (over 10 kHz), however, the switching losses dominate, increase the overall losses, reduce the efficiency and, in the case of very high values of the switching frequency, limit the power of the pulse width modulation inverter.

In many cases, however, a high switching frequency is desirable, for example to shift the switching frequency into the ultrasound range and thus to avoid audible noises during the operation of the pulse width modulation inverter, or is absolutely essential, for example to obtain a small distortion factor of the network currents in the case of photovoltaic pulse width modulation inverters. A high switching frequency is also required in order to keep the current ripple low and/or to enable a high control dynamics in the case of low-inductivity high-speed three-phase ac motors.

PRIOR ART

A known possibility for reducing the switching losses consists in using, instead of 2-level pulse width modulation inverters, 3-level pulse width modulation inverters. The latter have only approx. 50% of the switching losses of a 2-level pulse width modulation inverter, because in the case of 3-level pulse width modulation inverters the voltage jumps during switching are only half as high compared to a 2-level pulse width modulation inverter.

Another possibility for reducing the switching losses is included in the generic term "soft" switching. The aim of "soft" switching consists in preventing the simultaneous occurrence of high values of current and voltage during a switching-on or switching-off operation. The instantaneous value of the power loss as a product of current and voltage thus remains small—and therefore also the values of the switching-on or switching-off energy losses and the mean value of the switching power loss—, even if the switching frequency has very high values.

There are various techniques for the implementation of "soft" switching, which can be split up into the classes of snubber circuits (snubbers), quasi-resonant circuits and resonant circuits.

Thus, a generic circuit arrangement comprising a 3-level pulse width modulation inverter and a snubber circuit is known, for example, from U.S. Pat. No. 5,982,646. It is true that, with this circuit arrangement, the switching losses in the power semiconductors can be markedly reduced. The snubber circuit, however, operates in a manner involving a loss, i.e. it produces for its part losses which as a rule are greater than the saved switching losses. An improvement in the efficiency is not therefore possible. In addition, the time-related sequences of the discharge function are greatly dependent on the instantaneous value of the load current. This makes the pulse control process difficult.

There is known from DE 199 45 864 A1 a 3-level rectifier which is "soft" switched via a quasi-resonant circuit. Quasi-resonant circuits as a matter of principle reduce the switching losses loss-free. They are however very complex and expensive. Four power semiconductors are therefore again added in DE 199 45 864 A1, which must have the same current-carrying capacity as the power semiconductors of the pulse width modulation inverter itself. Moreover, the control of the power semiconductors, now totaling eight, is very complicated. Components can be destroyed even in the case of only a slight faulty control.

An example of a resonant circuit for the "soft" switching of a 3-level pulse width modulation inverter is shown in the article by S. Munk-Nielsen et al., "Comparison of soft and hard switching efficiency in a three-level single phase kW dc-ac converter", Aalborg University, Denmark, http://www.nsn.aau.dk/GetAsset.action?contentId=2375551&assetId=3519794 (retrieved on 15.02.2010). The circuit arrangement, however, has a poor overall efficiency and displays huge limitations in controllability.

Proceeding from this prior art, the object of the present invention consists in providing a circuit arrangement with a pulse width modulation inverter, which completely avoids all switching losses as a matter of principle, is simply designed and does not require any additional power semiconductors capable of being switched on and off.

DESCRIPTION OF THE INVENTION

The object is achieved with the circuit arrangement according to claim 1. Advantageous embodiments of the circuit arrangement are subject-matter of the dependent claims or can be derived from the following description and the examples of embodiment.

The proposed circuit arrangement comprises at least one 3-level pulse width modulation inverter with a snubber circuit and input terminals for a positive pole, a negative pole and a centre tap of an input voltage as well as an output terminal, at which the pulsed output voltage of the pulse width modulation inverter can be tapped. The 3-level pulse width modulation inverter is designed in a known manner, i.e. it comprises at least two outer switching elements, which are connected to the input terminals for the positive and the negative pole of the input voltage, and two inner switching elements, which are connected to the output terminal. Known switching topologies of 3-level pulse width modulation inverters can be implemented here, in particular in the form of the so-called "Three Level Stack Cell" (3L-SC) or in the form of the so-called "Three Level Neutral Point Clamped Inverter" (3L-NPC).

The proposed circuit arrangement is characterised in that the snubber circuit is formed by at least one coil or choke, two capacitors and a series connection of four diodes poled in the same direction. The two outer diodes are in each case directly connected to the input terminals for the positive and the negative pole of the input voltage. The electrical connection between the two inner diodes is connected on the one hand via the coil to the input terminal for the centre tap of the input voltage and on the other hand to the middle bridge branch of the pulse width modulation inverter. In one embodiment of the circuit arrangement, the two capacitors are in each case connected with a terminal directly to the respective direct electrical connection between one of the inner diodes and the outer diode adjacent to the latter in the series connection, and with the other terminal directly to the output terminal. In another embodiment, in particular in the case of a 3-level pulse width modulation inverter designed as a 3L-LC, the two capacitors are in each case connected with one terminal directly to the respective direct electrical connection between one of the inner diodes and the outer diode adjacent to the latter in the series connection, and with the other terminal via the two inner switching elements of the pulse width modulation inverter to the output terminal.

A connection between different elements of the circuit arrangement always means in the present patent application an electrical connection. A direct connection is understood to mean an electrical connection wherein no further capacitive or inductive elements or diodes are interconnected. However, such a connection can of course comprise an ohmic resistance. As switching elements, also referred to as valves, use may be made in the proposed circuit arrangement of power semiconductors which can be switched on and off, such as are already mentioned by way of example in the introduction to the description.

The present circuit arrangement can be designed both for single-phase as well as multi-phase 3-level pulse width modulation inverters. In the case of a circuit arrangement for the generation of three-phase output voltages, the circuit arrangement comprises for each phase a single-phase 3-level pulse width modulation inverter with the correspondingly described snubber circuit. All three single-phase pulse width modulation inverters and the respective snubber circuits are connected to the same input voltage or share the same input terminals, but have different output terminals—for the respective phases. The input voltage can of course also be an intermediate circuit voltage.

In the proposed circuit arrangement, all the switching losses are completely avoided as a matter of principle. Through the simple design of the snubber circuit, which in a preferred embodiment comprises a coil, two capacitors and four diodes, the circuit arrangement can be produced very cost-effectively, small and lightweight. No additional expensive power semiconductors able to be switched on and off and therefore also no expensive control circuits are required. The duration of the discharge function of the proposed snubber circuit is dependent only to a small extent on the load current and is therefore favorable for pulse control methods. The circuit arrangement has the further advantage of a robust and error-tolerant control without the risk of malfunctions. In an additional expansion phase, wherein the outer switching elements in particular are suitably triggered, the circuit arrangement is also very EMC-friendly (EMC: electromagnetic compatibility), since the gradient du/dt of the generated voltage pulses can easily be limited to non-critical values of $du/dt<1$ kV/µs.

In a preferred embodiment of the proposed circuit arrangement, the 3-level pulse width modulation inverter is constituted as a 3L-SC, as is explained in greater detail, for example, in the following examples of embodiment.

In an extension of the proposed circuit arrangement, a dipole with a partially ohmic characteristic is connected parallel to the coil of the snubber circuit, for example by means of a series connection comprising a capacitor and a resistor. Possible high-frequency oscillations at the end of a commutation process can thus be damped. This dipole can of course be implemented in another way.

In the present description and the following examples of embodiment, the control device for triggering the switching elements of the pulse width modulation inverter will not be dealt with further. The design of such a control device is known to the skilled person from the prior art of pulse width modulation inverters. In a particular embodiment of the present circuit arrangement, this control device is embodied such that the switching-on of the two outer switching elements is slowed down in a targeted manner. Lower EMC loads are thus obtained.

BRIEF DESCRIPTION OF THE DRAWINGS

The proposed circuit arrangement is again explained below in greater detail with the aid of examples of embodiment in connection with the drawings. In the figures.

WAYS OF PERFORMING THE INVENTION

Figure 1:
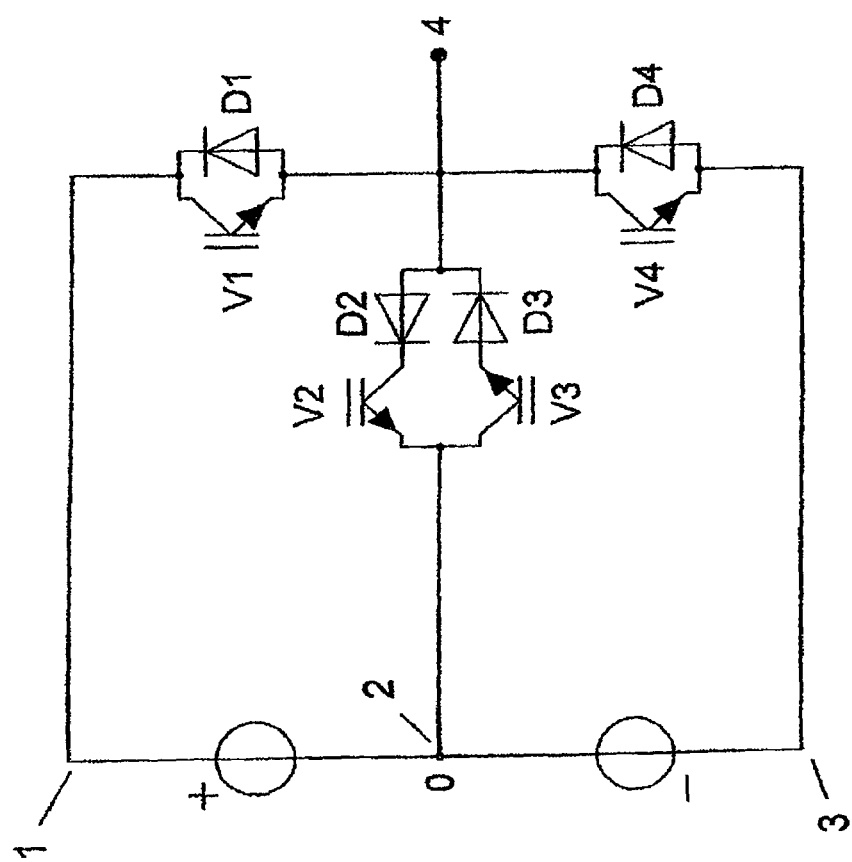
FIG. 1 shows an example of a 3-level pulse width modulation inverter in a 3L-SC realization according to the prior art.

FIG. 1 shows, by way of example, an embodiment of a three-level pulse width modulation inverter in a 3L-SC form according to the prior art. This pulse width modulation inverter is connected with its upper bridge branch to input terminal 1 for the positive pole of the input voltage, with its lower bridge branch to input terminal 3 for the negative pole of the input voltage and with its middle bridge branch to input terminal 2 for the centre tap of the input voltage. It comprises four switching elements V1 to V4, which are triggered, i.e. switched on and off, by a control device not represented, in such a way that a pulsed output voltage can be tapped at output terminal 4. Diodes D1 to D4 are each connected anti-parallel to switching elements V1 to V4.

Figure 2:
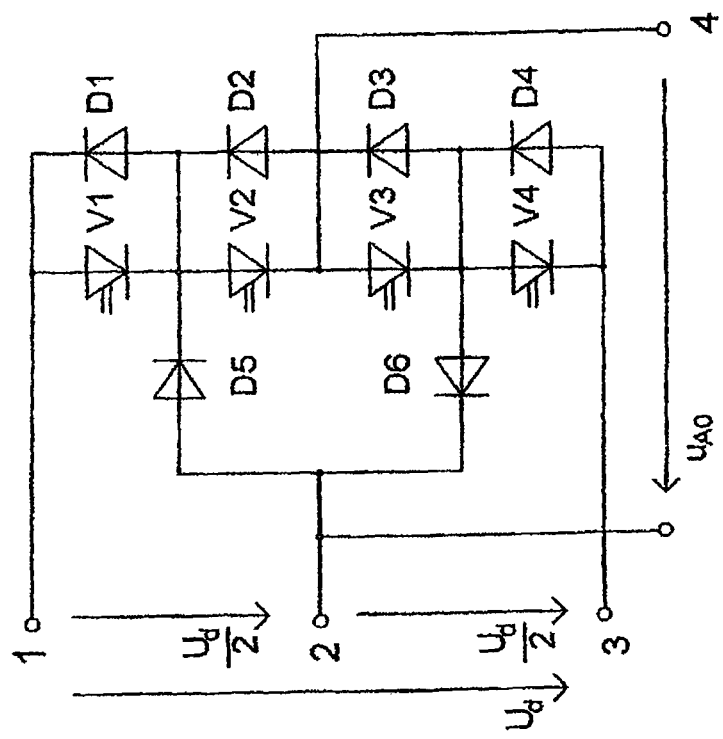
FIG. 2 shows an example of a 3-level pulse width modulation inverter in a 3L-NPC realization according to the prior art.

FIG. 2 shows an example of a 3-level pulse width modulation inverter in a 3L-NPC form according to the prior art. Likewise with this pulse width modulation inverter, the upper bridge branch, the lower bridge branch and the middle bridge branch are connected to input terminals 1-3 for the positive pole, the negative pole and a centre tap of the input voltage. This pulse width modulation inverter also comprises four switching elements V1 to V4 with diodes D1 to D4 connected anti-parallel in each case and in addition two further diodes D5, D6 in the middle bridge branch.

Figure 3:
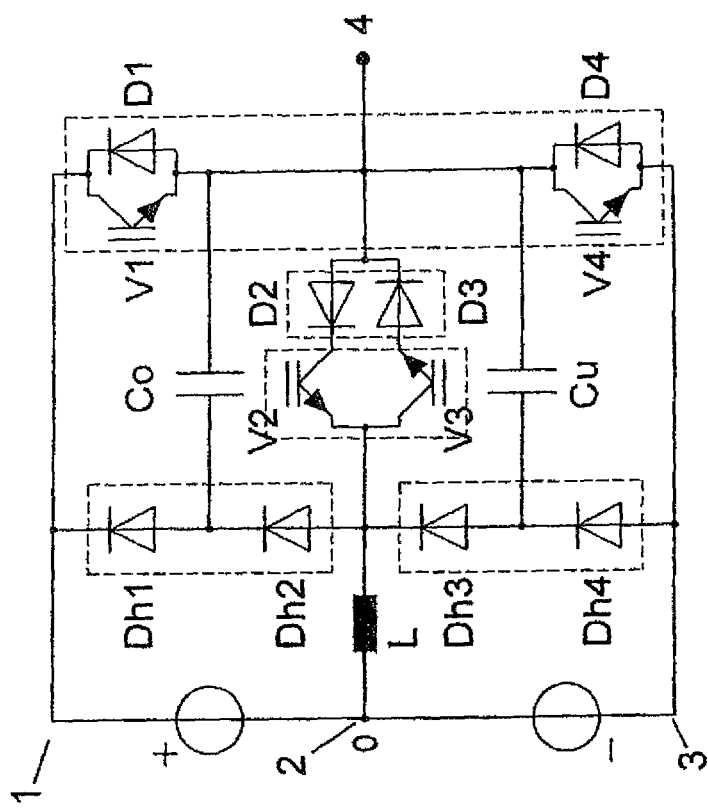
FIG. 3 shows a first example of an embodiment of the proposed circuit arrangement.

Both embodiments of FIGS. 1 and 2 represent "hard" switching pulse width modulation inverters, which precisely exhibit high power losses at high switching frequencies. In order to avoid these switching losses, a snubber circuit is added to the pulse width modulation inverter in the proposed circuit arrangement. In this regard, FIG. 3 shows a first example of embodiment of the proposed circuit arrangement, wherein the 3-level pulse width modulation inverter of FIG. 1 is connected to the snubber circuit. Compared with the other embodiments represented later, this embodiment has the advantage of the simplest design and the smallest number of power components.

The snubber circuit comprises a coil L, two capacitors Co and Cu as well as four diodes Dh1 to Dh4 connected homopolar in series. The terminals of two outer diodes Dh1 and Dh4 are connected directly to input terminals 1 and 3 respectively for the positive and negative pole of the direct voltage (input voltage). Capacitors Co and Cu are connected with one terminal to the electrical connection between inner diode Dh2 and adjacent outer diode Dh1 and respectively inner diode Dh3 and adjacent outer diode Dh4 and, with their other terminal, directly to output terminal 4 of the circuit arrangement, or more precisely the pulse width modulation inverter. The connection, present without a snubber circuit, between input terminal 2 for the centre tap of the input voltage and the middle bridge branch, i.e. inner switching elements V2 and V3 (see FIG. 1), has been separated. Coil L has been inserted here, which moreover—just like the middle bridge branch—is connected to the connection between the two inner diodes Dh2, Dh3. This circuit is shown in FIG. 3.

Such a circuit design can be produced very advantageously with commercially available modules, which are indicated with a dashed line in FIG. 3. The proposed circuit arrangement can be produced very cost-effectively through the availability of commercial modules for the individual components or component assemblies.

A 3-level pulse width modulation inverter comprises three so-called switching states, which are referred to below as "above", "middle" and "below", which is intended to mean the current supply via the upper, the middle or the lower bridge branch in the representation of FIG. 3. The load current can be positive or negative and in the special case also 0 in each of these switching states. As a result, there is a plurality of possible switching operations, also referred to as commutation, between these switching states: above→middle, middle→above, middle→below, below→middle, above→below and below→above, in each case for load current>0, for load current<0 and for load current=0. For reasons of symmetry, this number of switching operations can be reduced to four switching operations (+two special cases for load current=0):

| load current > 0 | Special case: load current = 0 |
| --- | --- |
| above → middle | above → middle |
| middle → above | middle → above |
| middle → below | middle → below (as middle → above) |
| below → middle | below → middle (as above → middle) |

The special cases of load current=0 can be summed up with the four cases for load current>0:

| Load current ≧ 0 |
| --- |
| above → middle |
| middle → above |
| middle → below |
| below → middle |

These four commutations proceed differently. They have in common the fact that high values of voltage and current never occur simultaneously at the switching elements during the respective operation. The instantaneous value of the power loss as a product of voltage and current thus has only small values, so that the mean value of the switching power loss also remains small. The desired effect of the discharge of switching losses is thus achieved. The discharge effect is achieved, because voltages at the switching elements can rise only with a limited gradient du/dt on account of the capacitors in the snubber circuit and/or currents through the switching elements can rise only with a limited gradient di/dt on account of the coil in the snubber circuit.

By way of example, one of the four commutations, in this example the commutation above→middle, is described below by way of example qualitatively with the aid of FIGS. 4a to 4d. The left-hand part of the figures shows in each case the proposed circuit arrangement with a connected load in the case of a positive load current. The current profile occurring in the given state is marked in bold. The right-hand part of the figures shows in each case the profile of the nominal voltage at the load (u_load_nominal), the actual profile of the voltage at the load (u_load_actual), the voltage profile at the lower capacitor Cu (u_Cu), the current profile at the coil L (i_L), the voltage profile at the upper switching element V1 (u_V1) and the current profile at the upper switching element V1 (i_V1). The respective phase of the commutation is indicated by the dashed border.

Figure 4A:
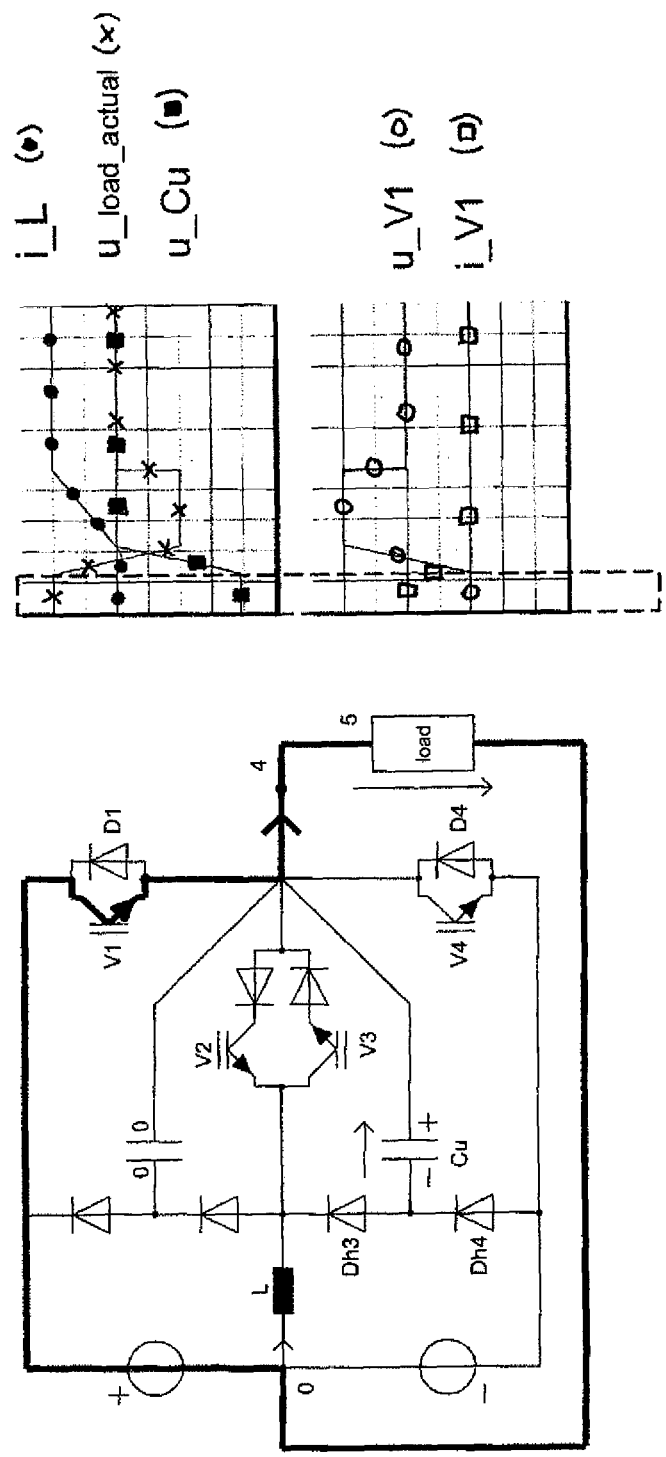
FIG. 4a-d shows an example of a commutation operation with the circuit arrangement of FIG. 3.

FIG. 4a shows the state before the commutation. The load current is regarded as ideally inductively impressed. The following therefore applies: load current=const.

Switching element V1 is triggered and carries this positive load current. Switching elements V2 and V4 are blocked. Switching element V3 is also triggered, i.e. switched on, but does not yet carry any current.

Lower capacitor Cu, as represented, is charged up to the input direct voltage. Upper capacitor Co does not take part in the commutation described below, its voltage remaining 0. The path to the centre tap of the direct voltage and therefore the coil L are currentless.

The commutation is started by the fact that switching element V1 is blocked and at the same time switching element V2 is switched on. V3 continues to remain switched on, V4 remaining blocked.

Figure 4B:
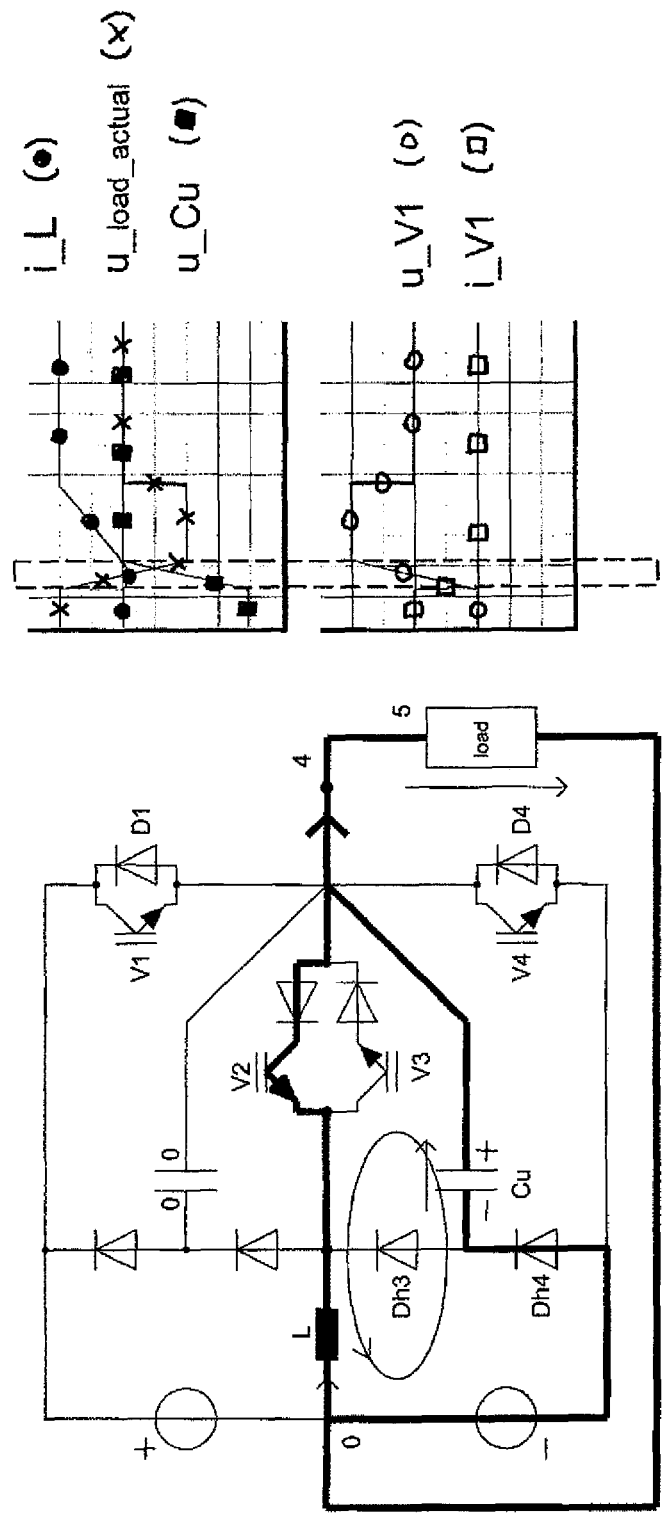

In this regard, FIG. 4b shows the first phase of the commutation. V1 becomes abruptly currentless. Since the load current is impressed inductively, it must continue to flow. It finds a path via the lower half of the direct voltage, diode Dh4 and capacitor Cu. The discharge of capacitor Cu thus starts. It is important that, immediately after the drop of the current through V1 to zero, the voltage at V1 has only a very small value. The simultaneous occurrence of high values of current and voltage during switching-off of V1 is thus avoided.

Since switching element V2 is switched on at the same time as the blocking of V1, a second current circuit from V2 arises with series-connected diode D2, coil L, the lower half of the direct voltage, diode Dh4 and capacitor Cu. This current circuit is an oscillation circuit. A sinusoidal current thus begins through coil L (in the negative direction).

Both sub-operations are superimposed. The end of this first phase of the commutation results from the fact that capacitor Cu is discharged. On account of diode D4, it cannot be charged on a reversed polarity. Instead, the current changes from Cu to this diode D4. At the same time as u_Cu=0, the current through L has also become zero. This does not however have any significance.

Figure 4C:
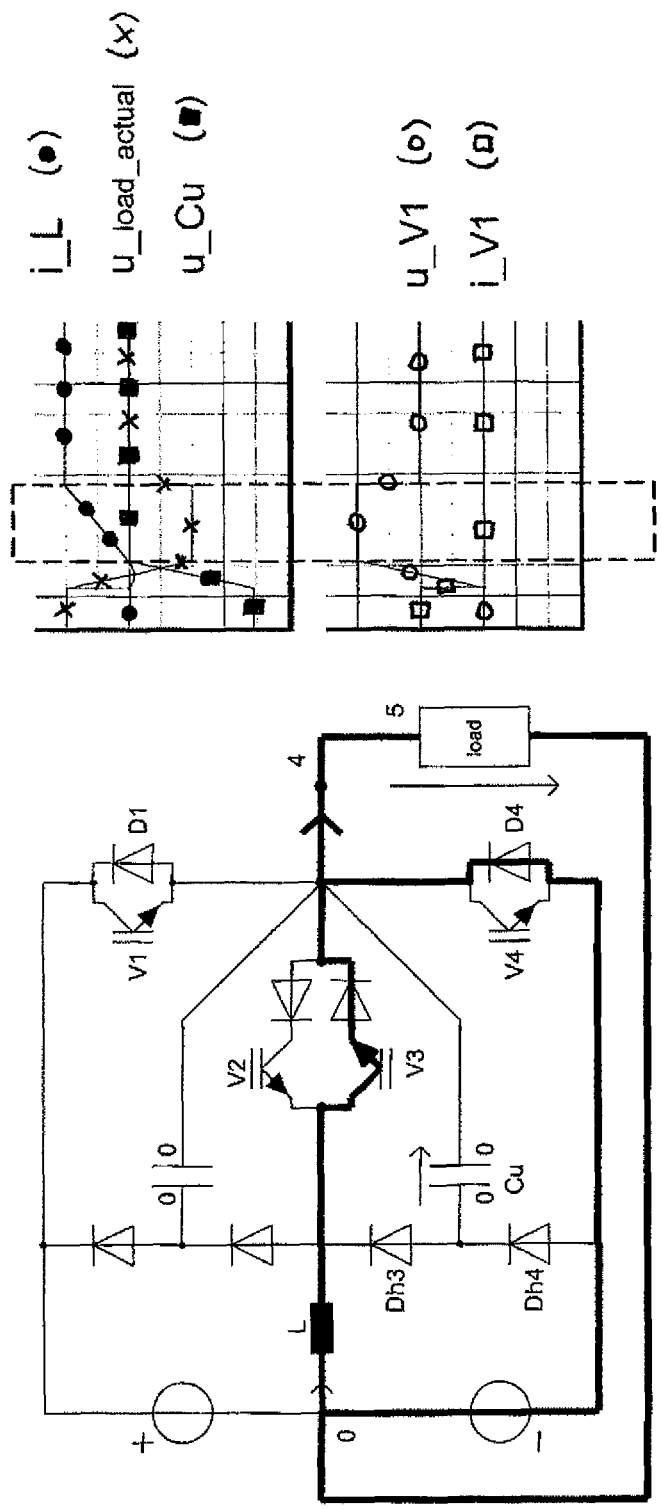

FIG. 4c shows the second phase of the commutation. As before, V2 and V3 are switched on, V1 and V4 being switched off. The current through L at first continues to be zero and the load current flows completely through D4. Since, however, the lower half of the direct voltage is present at coil L, the current through L increases in a time-linear manner and the current through D4 correspondingly diminishes in a time-linear manner. The second phase of the commutation ends by the fact that the current through D4 becomes zero and D4 blocks.

Figure 4D:
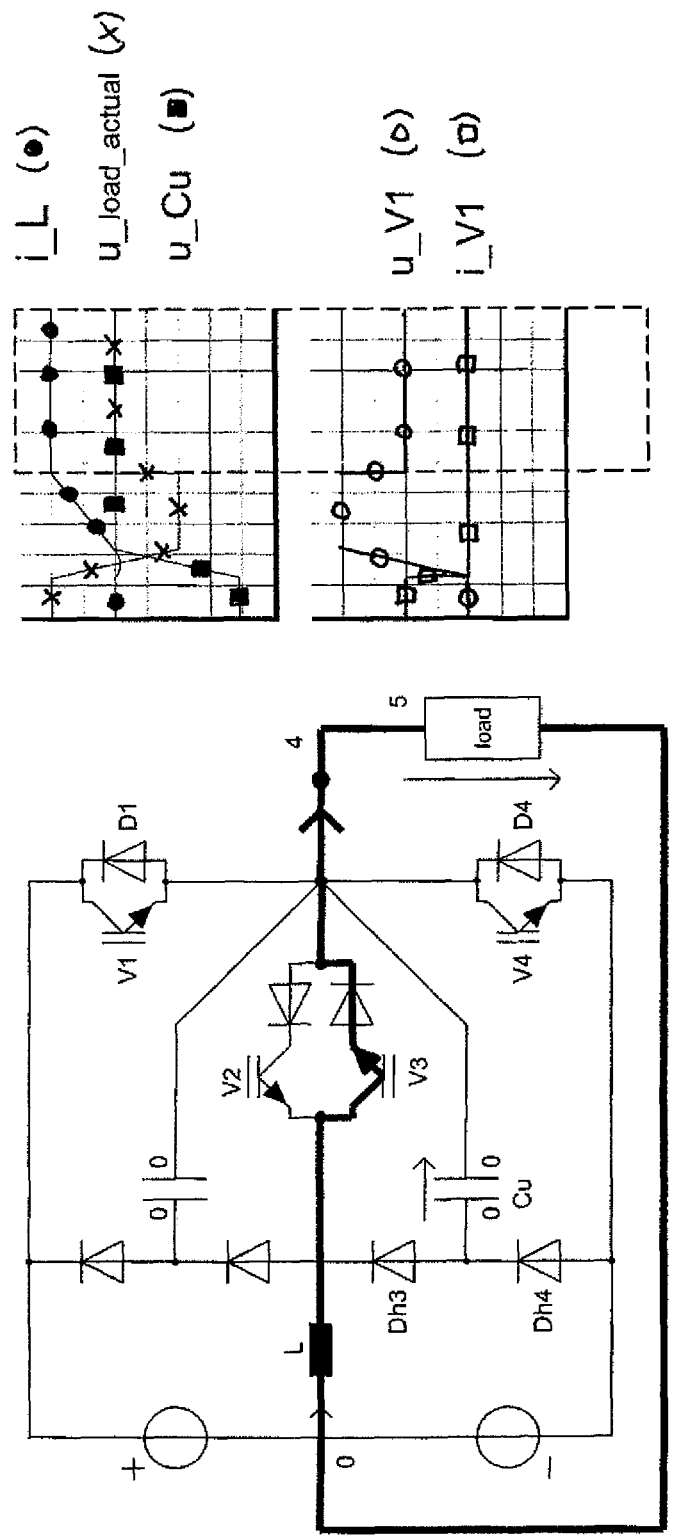

FIG. 4d finally shows the state after the commutation. As before, V2 and V3 are switched on, but V2 is currentless. The load current flows via V3 and series-connected diode D3. V1 and V4 continue to be blocked. Both capacitors Co and Cu are discharged, their voltages being zero. The load current now flows via the middle bridge branch.

The further commutations proceed in a comparable manner, though different current profiles necessarily occur. However, in each of these commutations "soft" switching is obtained, wherein high values of voltage and current at switching elements V1 to V4 and diodes D1 to D4 do not arise simultaneously, as in the case of "hard" switching. Either the voltage or the current rises with a time lag at valves V1 to V4 and also at diodes D1 to D4.

Switching losses are therefore for the most part avoided with the present circuit arrangement.

An example of an implementation of such a circuit arrangement is designed single-phase (corresponds to 10 kVA three-phase) for an input direct voltage of 2×270 V=540 V, an output current of up to 25 A (peak value) and a power of 3.3 kVA. The following components are used: for the pulse width modulation inverter two IGBT modules of the SEMIKRON SKM50 GB12V type
    one diode module of the SEMIKRON SKKD42F1000 type
    for the snubber circuit
    a coil L=14 µH; ferrite core RM14
    two capacitors C=33 nF; type MKP10
    four diodes of the DIOTEC UF600M type For the operation of the present circuit arrangement, control circuits (drivers) are used for the individual switching elements and a microcontroller control is used to generate the pulse-width-modulated signals. Such control devices are known from the prior art.

Figure 5:
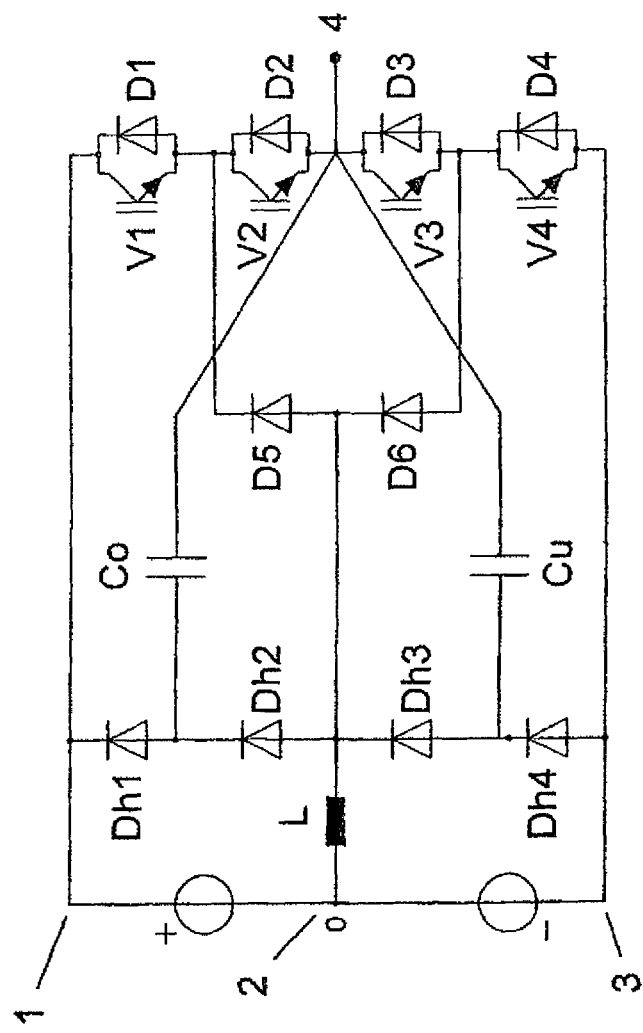
FIG. 5 shows a second example of an embodiment of the proposed circuit arrangement.

FIG. 5 shows a further example of the proposed circuit arrangement, wherein the three-level pulse width modulation inverter is designed as a 3L-NPC inverter. This inverter comprises the four switching elements V1 to V4 with, in each case, anti-parallel connected diodes D1 to D4. In addition, two additional diodes D5, D6 are required with this inverter, as can be seen from FIG. 5. Here too, the snubber circuit is constituted and connected in the same way as has already been explained in detail in connection with FIG. 3.

In the case of this circuit arrangement, however, one of the main advantages of the 3L-NPC inverter is lost. This lies in the fact that all the switching elements have to be designed only for half the direct voltage. If a 3L-NPC inverter is combined with the proposed snubber circuit, as represented in FIG. 5, the two outer switching elements V1 and V4 must be designed for the total direct voltage.

Figure 6:
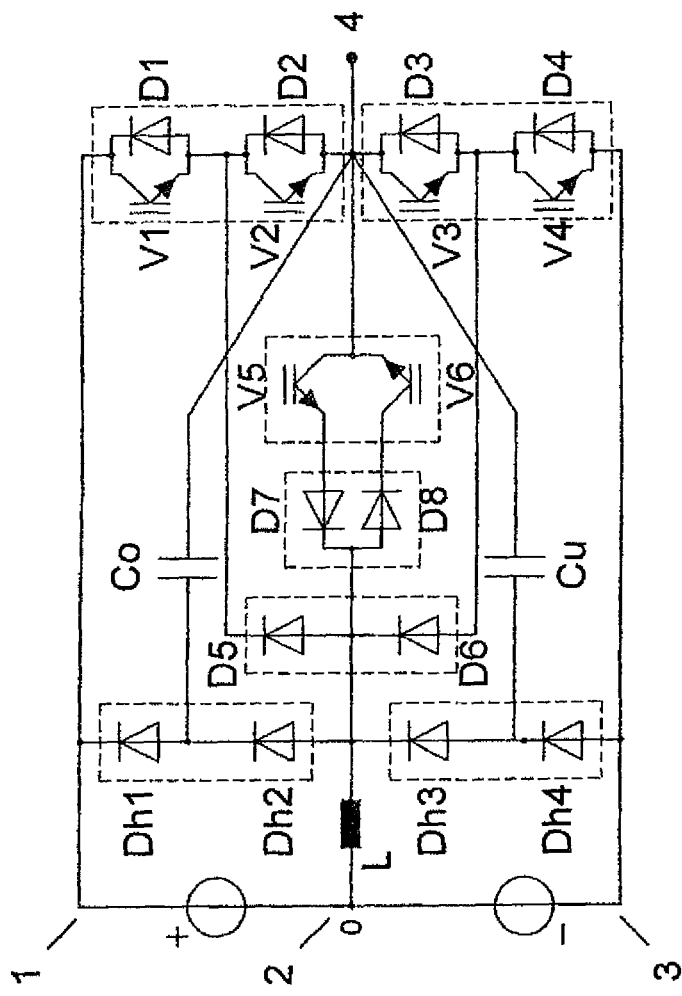
FIG. 6 shows a third example of an embodiment of the proposed circuit arrangement.

This latter-mentioned disadvantage can be avoided in a further embodiment of the present circuit arrangement, as is represented in FIG. 6. Two further switching elements V5 and V6, for example IGBT, and two further diodes D7 and D8 have to be used for this purpose, as can be seen in the figure. The expenditure therefore increases considerably compared to the embodiments of FIGS. 3 and 5. However, this variant may be advisable in the middle voltage range, for example with input direct voltages between approx. 2000 and 3000 V, since IGBT of the low-cost voltage class 1700 V could then be used despite the high direct voltage.

Here too, there is the possibility of producing the circuit structure with commercially available modules, which are indicated by dashed lines in FIG. 6.

Of the three circuit variants of the present circuit arrangement mentioned by way of example, the first variant of FIG. 3 with the embodiment of the 3-level pulse width modulation inverter in the 3L-SC form offers the most advantages in terms of the simple and low-cost structure. This already leads to the preferred area of use. Since the outer switching elements have to be designed for the full direct voltage, the latter should not assume excessively high values. The range from approx. 600 V to approx. 1200 V could be reasonably adopted. In this range, 1200 V or 1700 V modules, for example, could then be used, which are produced cost-effectively in large unit numbers. This voltage range is present in photovoltaic inverters and electric drives in the low-voltage range (e.g. also in the case of hybrid cars). Another useful range could lie between approx. 3000 V and approx. 4000 V. In this range, use could then be made of 6500 V components, such as are produced for medium voltage drives (e.g. local transport and mainline railways).

Figure 7:
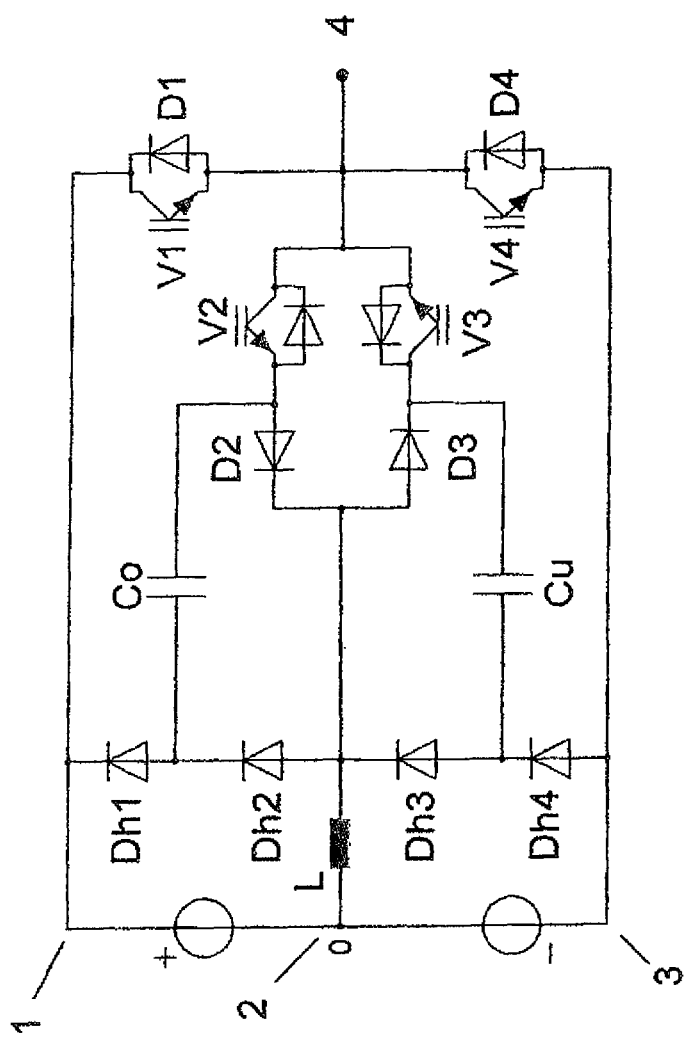
FIG. 7 shows a fourth example of an embodiment of the proposed circuit arrangement.

FIG. 7 shows a further possible embodiment of the proposed circuit arrangement, which is characterised by a modified coupling of the snubber circuit to the three-level pulse width modulation inverter. Instead of the direct connection of the two capacitors Cu and Co to output terminal 4, the latter are connected here via the two inner switching elements V2 and V3 to output terminal 4. This also requires two additional diodes, as can be seen in the figure. This modified coupling has no effect on the commutations described above. An additional mode of operation does however result. If the two inner switching elements of V2, V3 remain permanently blocked, the snubber circuit becomes decoupled from the 3-level pulse width modulation inverter. The 3-level pulse width modulation inverter then transfers into a "hard" switching 2-level pulse width modulation inverter, wherein only the two outer switching elements V1 and V4 are switched on in an alternating manner in the sense of a pulse width modulation.

This mode of operation may be advisable for example in the case of photovoltaic inverters. When there is an overcast sky, the latter are often operated in the lower partial load region. When the snubber circuit is in operation here, it produces undesired losses, e.g. in the coil, which reduce the efficiency. Here, it may be more favorable to put the snubber circuit out of operation and to work with a "hard" switching 2-level pulse width modulation inverter. The circuit arrangement proposed here by way of example enables such a change of the mode of operation.

Figure 8:
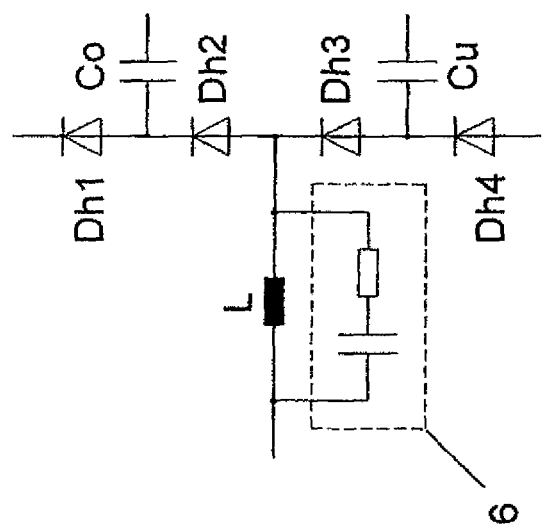
FIG. 8 shows an example of the formation of a dipole in the snubber circuit of the proposed circuit arrangement.

With a possible extension of the present circuit arrangement, a dipole 6 with a partial ohmic characteristic is connected in parallel to coil L of the snubber circuit. This can be achieved for example with a series connection of a capacitor and a resistor, as is represented in FIG. 8. Coil L of the snubber circuit may possibly form an oscillation circuit at the end of a commutation with parasitic capacitances (e.g. by IGBT and diodes) and lead to high-frequency oscillations of several MHz. These oscillations are undesirable from the EMC standpoint. These oscillations are attenuated with the extension of a suitably dimensioned dipole proposed here, so that the EMC compatibility is increased.

For EMC applications, it is desirable, and for some applications such as for example in aeronautics also necessary, to limit the voltage gradients du/dt of the output voltages in order to increase the electromagnetic compatibility, for example to values between 500 V/µs and 1000 V/µs. Through the proposed circuit arrangement, such a limitation is already partially achieved; not however with all the commutations, but rather only with around half of these operations. With a very simple measure, however, this limitation can be expanded for the whole operation of the circuit arrangement, i.e. to all the commutations. For this purpose, the switching operation of outer switching elements V1, V4 in particular is slowed down in a targeted manner. Such an operation of the pulse width modulation inverter is then particularly EMC-friendly. The additional delay can easily be achieved by the drivers of the individual switching elements.

The voltage gradient du/dt of the output voltage is in this case reduced via the nature of the triggering of the IGBT, JFET or MOSFET. The latter are triggered by a control voltage, e.g. −15 V for the OFF state and +15 V for the ON state. If, during switching-on, the transition of the control voltage from −15 V to +15 V is slowed down in a targeted manner, the du/dt value of the output voltage falls.

In the case of hard switching pulse width modulation inverters, this is not possible because now the switching-on operation, i.e. the reduction of the voltage at the switching element (with an already full load current!), takes longer overall and the switching-on energy loss E_on therefore becomes much greater. Either the high du/dt has to be accepted or expensive filters for the du/dt reduction have to be connected between the pulse width modulation inverter and the motor.

In the case of the circuit according to the invention, this slowing-down is possible because the current through the switching element can rise only with a limited di/dt on account of coil L. The voltage at the switching element falls at, for example, 500 V/µs, the current rising at, for example, 30 A/µs. Compared with a fully discharged switching operation, a slightly higher energy loss E_on arises, which however can be tolerated. Expensive filters are not required here.

The implementation of this slowing-down can be realized in a simple manner by connecting a suitably dimensioned ohmic resistor between the driver circuit and the control connection of the IGBT etc. Its retarding effect is specified in the data sheets (diagram of switching times as a function of the Gate series resistance R_Gate).

Modifications of the circuit arrangements represented in the examples are of course also possible, such as for example a transposition of the sequence of switching element V2 and V5 and respectively diode D2 and D7 connected in series thereto and/or a transposition of switching element V3 and V6 and respectively diode D3 and D8 connected in series thereto in FIG. 3 and FIG. 6. Neither affects the mode of functioning of the proposed circuit arrangement. Advantages with the type of usable semiconductor modules could however arise.

Compared to conventional pulse width modulation inverters, the proposed circuit arrangement has smaller losses and therefore a reduced coolant requirement. Further advantages are a higher degree of efficiency, an increase in power and the possibility of increasing the switching frequency.

LIST OF REFERENCE NUMBERS

| | |
|---|---|
| 1 | input terminal for positive pole |
| 2 | input terminal for centre tap |
| 3 | input terminal for negative pole |
| 4 | output terminal |
| 5 | load |
| 6 | dipole |
| L | coil of snubber circuit |
| Co, Cu | capacitors of snubber circuit |
| Dh1-Dh4 | diodes of snubber circuit |
| V1-V6 | switching elements of inverter |
| D1-D8 | diodes of inverter |
| $U_d$ | input voltage |

The invention claimed is:

1. A circuit arrangement which comprises at least one 3-level pulse width modulation inverter with a snubber circuit and comprises input terminals (1-3) for a positive pole, a negative pole and a centre tap of an input voltage as well as an output terminal (4), wherein the pulse width modulation inverter comprises at least two outer switching elements (V1, V4), which are connected to the input terminals (1, 3) for the positive and the negative pole of the input voltage, and two inner switching elements (V2, V3), which are connected to the output terminal (4), wherein the snubber circuit is formed by at least one coil (L), two capacitors (Cu, Co) and a series connection comprising four diodes (Dh1-Dh4) poled in the same direction, wherein the two outer (Dh1, Dh4) of the four diodes are in each case directly connected to the input terminals (1, 3) for the positive and the negative pole of the input voltage, an electrical connection between the two inner (Dh2, Dh3) of the four diodes is connected on the one hand via the coil (L) to the input terminal (2) for the centre tap of the input voltage and on the other hand to a middle bridge branch of the pulse width modulation inverter, and the two capacitors (Cu, Co) are in each case connected with one terminal to, in each case, an electrical connection between one of the inner (Dh2, Dh3) and the outer (Dh1, Dh4) of the four diodes respectively adjacent in the series connection, and with the other terminal directly or via the two inner switching elements (V2, V3) of the pulse width modulation inverter to the output terminal (4).

2. The circuit arrangement according to claim 1, wherein the 3-level pulse width modulation inverter is designed as a 3-Level-Stack-Cell inverter.

3. The circuit arrangement according to claim 1, wherein the 3-level pulse width modulation inverter is designed as a 3-Level-Neutral-Point-Clamped inverter.

4. The circuit arrangement according to claim 1, wherein the 3-level pulse width modulation inverter is designed as a 3-Level-Neutral-Point-Clamped inverter, wherein the middle bridge branch additionally comprises two switching elements (V5, V6) connected in parallel with in each case a diode (D7, D8) connected in series, via which the electrical connection between the two inner (Dh2, Dh3) of the four diodes of the snubber circuit is connected to the output terminal (4).

5. The circuit arrangement according to any one of claims 1 to 4, wherein a dipole (6) is connected parallel to the coil (L) of the snubber circuit for oscillation attenuation.

6. The circuit arrangement according to claim 1 with a control device for a pulse-width-modulated triggering of the switching elements.

7. The circuit arrangement according to claim 6, wherein the control device comprises a driver circuit for the switching elements with one or more components, which reduce the gradient of a rising flank during the switching-over of the control voltage for switching-on of the outer switching elements.

* * * * *